United States Patent [19]

Fisher et al.

[11] Patent Number: 5,667,243
[45] Date of Patent: Sep. 16, 1997

[54] AIR BAG MODULE

[75] Inventors: Margaret Ann Fisher; David Scott Weckesser, both of Dayton, Ohio

[73] Assignee: General Motors Corporation, Detroit, Mich.

[21] Appl. No.: 609,069

[22] Filed: Feb. 29, 1996

[51] Int. Cl.[6] .................................................. B60R 21/22
[52] U.S. Cl. ............................. 280/730.2; 280/743.1
[58] Field of Search ........................... 280/730.1, 730.2, 280/743.1

[56] References Cited

U.S. PATENT DOCUMENTS

| | | | |
|---|---|---|---|
| 4,946,191 | 8/1990 | Putsch | 280/730.2 |
| 5,112,079 | 5/1992 | Haland et al. | 280/730.2 |
| 5,322,322 | 6/1994 | Bark et al. | 280/730.2 |
| 5,348,342 | 9/1994 | Haland et al. | 280/730.2 |
| 5,498,030 | 3/1996 | Hill et al. | 280/743.1 |
| 5,503,428 | 4/1996 | Awotwi et al. | 280/730.2 |
| 5,553,887 | 9/1996 | Karlow et al. | 280/730.2 |
| 5,556,128 | 9/1996 | Sinnhuber et al. | 280/730.2 |
| 5,564,739 | 10/1996 | Davidson | 280/730.2 |

*Primary Examiner*—Kenneth R. Rice
*Attorney, Agent, or Firm*—Kathryn A. Marra

[57] ABSTRACT

An air bag module is provided in a vehicle having a vertical vehicle axis and having a horizontal vehicle axis. The air bag module includes an inflator having an elongated vertical inflator axis. The inflator discharges inflator gas which is directed in a longitudinal direction perpendicular to the vertical inflator axis. An air bag includes a main body portion having a shape that is angled with respect to the longitudinal direction. Preferably, the longitudinal direction is angled upwardly relative the horizontal vehicle axis and the main body portion of the air bag is angled downwardly relative the longitudinal direction. Preferably, the main body portion includes upper and lower downwardly angled edges which are generally parallel to the horizontal vehicle direction when the air bag is inflated.

23 Claims, 7 Drawing Sheets

AIR BAG MODULE

This invention relates generally to vehicle air bag modules, and more particularly to an air bag having an improved shape and fold configuration.

BACKGROUND OF THE INVENTION

It is well known in motor vehicles to employ an inflatable air bag to restrain an occupant. Air bags are commonly mounted in an air bag module with an inflator for generating gas to inflate the air bag upon sensing predetermined vehicle conditions.

It is known to provide an air bag suited for side impact protection of the torso and/or head of the occupant which is typically located in the vehicle seat, door or side pillar. Air bags used for side impact protection must quickly deploy into a convenient position for side protection of the occupant. For seat-mounted modules, this is typically accomplished in the prior art by providing a horizontally symmetrical, tube-shaped air bag that deploys straight out in a direction that is parallel to the direction of the discharging inflator gas.

Due to packaging constraints, it may be desirable to place the module in the vehicle at a particular height or at a particular angle such that conventional air bag inflation in the direction of the discharging inflator gas places the air bag in a location that is not convenient for side impact protection.

SUMMARY OF THE INVENTION

This invention preferably provides an air bag module having an air bag with an improved air bag shape and fold which is particularly well-adapted for use in air bag modules for side impact protection. Advantageously, the direction of the discharging inflator gas can be angled relative to the desired direction of air bag deployment, thus providing greater flexibility in packaging of side impact modules in the vehicle.

These advantages are preferably accomplished by providing an air bag module in a vehicle having a vertical vehicle axis and having a horizontal vehicle axis. The air bag module includes an inflator having an elongated vertical inflator axis. The inflator discharges inflator gas which is directed in a longitudinal direction perpendicular to the vertical inflator axis. An air bag includes a main body portion having a shape that is angled with respect to the longitudinal direction. Preferably, the longitudinal direction is angled upwardly relative the horizontal vehicle axis and the main body portion of the air bag is angled downwardly relative the longitudinal direction. Also preferably, the vertical inflator axis is angled backwards relative the vertical vehicle axis and the main body portion is angled downwardly approximately the same amount relative to the longitudinal direction as the vertical inflator axis is angled backwards relative to the vertical vehicle axis whereby upon air bag deployment the main body portion is generally parallel relative to the horizontal vehicle axis. Preferably, the main body portion includes upper and lower downwardly angled edges which are generally parallel to the horizontal vehicle axis when the air bag is inflated.

In accordance with another preferred aspect, the main body portion of the air bag includes a central portion extending in the longitudinal direction and the air bag includes a lower portion extending downward from the central portion. Preferably, the lower portion has a generally triangular shape, has a vertical dimension continually increasing in a direction away from the inflator, and has a volume substantially equal to or greater than the central portion. Preferably, the lower portion is longitudinally folded atop the central portion such that when inflation of the air bag is unrestrained, the inflator gas is biased towards initially filling the central portion and when air bag inflation is obstructed, the inflator gas is biased towards unfolding and filling the lower portion of the air bag.

BRIEF DESCRIPTION OF THE DRAWINGS

An embodiment of the present invention is described below, by way of example only, with reference to the accompanying drawings in which.

DESCRIPTION OF THE PREFERRED EMBODIMENT

Figure 1:
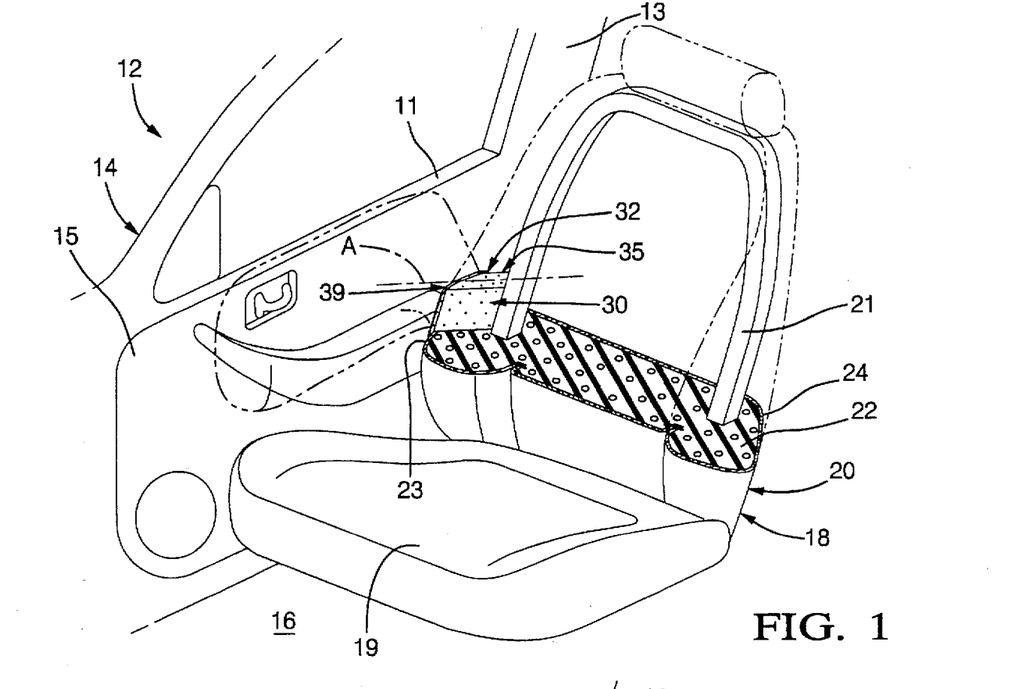
FIG. 1 is a perspective view of a vehicle interior partially-broken-away and showing an air bag module located in a seat in an undeployed condition in solid lines and showing an air bag in the fully inflated condition in phantom lines.

Referring to FIG. 1, it is seen that a vehicle 12 includes a door 14 having an inner door panel 15 mounted thereon and a generally horizontally extending belt line 11 atop the inner door panel 15. An interior 16 of the vehicle 12 includes side pillars 13 and a seat 18 for a vehicle occupant (not shown), the seat 18 having a seat bottom 19 and an upper seat back 20. The seat back 20 includes a rigid seat frame 21, preferably being metal or other suitable strength material. The seat back 20 is normally tilted back to a seat back angle of approximately 20–25 degrees relative a vertical axis of the vehicle 12. The seat frame 21 is encompassed within a foam cushion material 22 covered by fabric seat material 24 defining an outer contour of the seat back 20. The seat back 20 includes an outboard side edge 23 extending generally parallel to the seat back 20 and located proximate the door 14.

Figure 3:
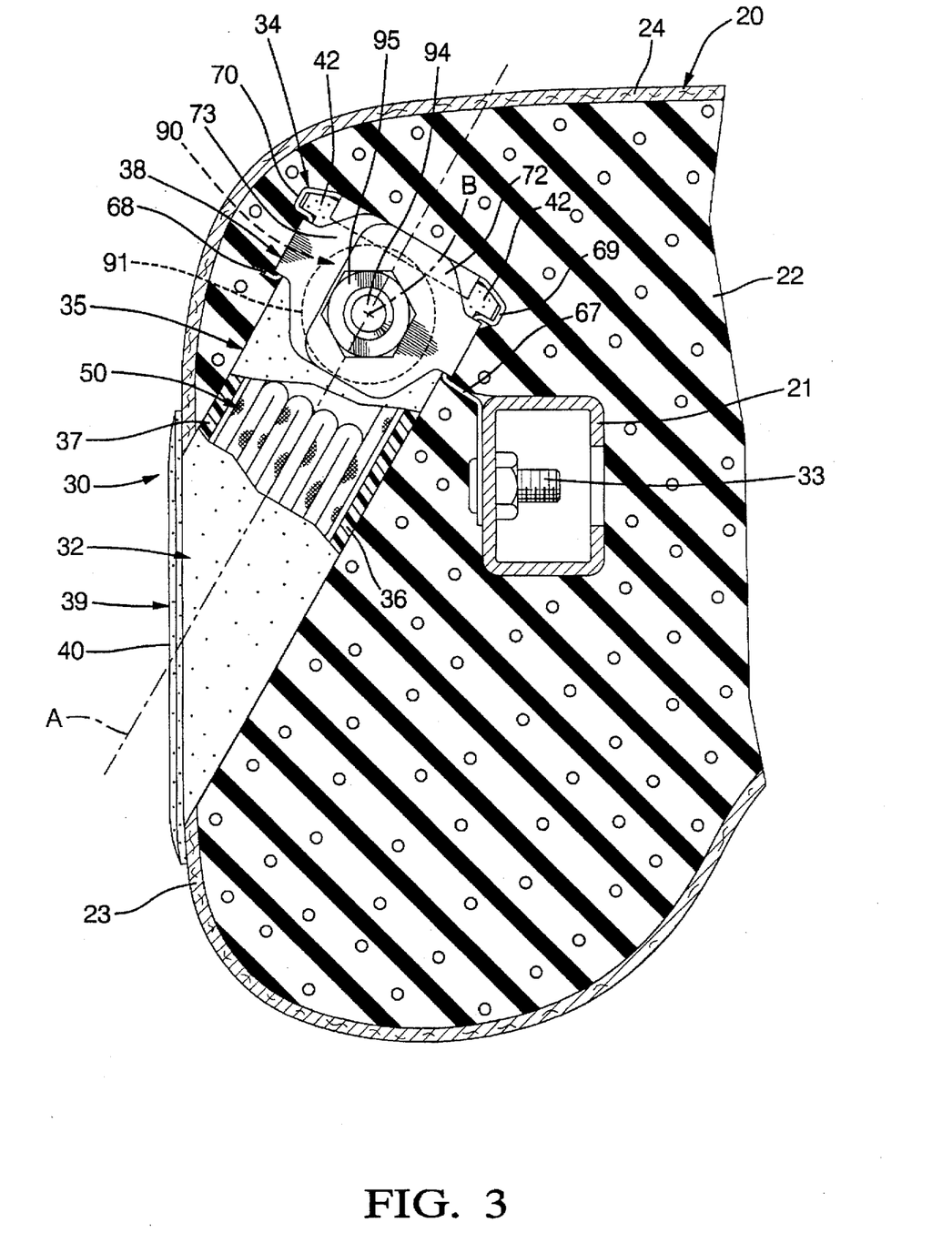
FIG. 3 is a sectional view through the seat showing a top view of the module with the module partially-broken-away and in the undeployed condition.

FIG. 3 best illustrates the component parts of a complete air bag module, generally designated as 30. The module 30 includes an inflator 90, an air bag 50, a housing 32 including a frame 34 and a cover 35, and mounting studs 33 extending through the frame 34 of the housing 32 for mounting the entire module 30 to any suitable vehicle structure, such as the seat frame 21.

The housing 32 may be of any suitable construction for housing the inflator 90 and air bag 50 prior to air bag inflation and is in no way limited to the particular embodiment shown. The particular housing 32 shown includes the frame 34, the cover 35, and a retainer strap 38. The frame 34 is an extruded channel of a suitable strength material and has side walls 67, 68 and slide locking features 69, 70. The side wall 67 of the frame 34 is angled inwardly towards the seat frame 21 and carries a pair of mounting studs 33 which enable attachment of the module 30 to the seat frame 21 as shown in FIG. 3. The housing 32 and inflator 90 have a corresponding longitudinal axis A that is angled outward towards the door 14, preferably about 20 degrees relative the forward direction of the vehicle 12.

The cover 35 is preferably a molded plastic material having a first cover side wall 36 and a second cover side wall 37. The first and second cover side walls 36, 37 have unequal lengths with the first cover side wall 36 being longer than the second cover side wall 37. The cover side walls 36, 37 extend in the longitudinal direction outward from the frame 34 to the outboard side edge 23 of the seat 18. The cover side walls 36, 37 are spaced apart and opposing and preferably extend parallel to each other in the longitudinal direction. An end wall 39 is preferably integrally molded with the cover 35 and extends between the first and second cover side walls 36, 37. The end wall 39 preferably extends out beyond the fabric seat material 24 of the seat back 20 and has an outer show surface 40 that fits flushly against the outboard side edge 23 of the seat back 20. The end wall 39 preferably has a flap portion 41 formed by a molded-in C-shaped tear seam 44 that hinges open about a rearward edge during air bag deployment, as described below.

The cover 35 preferably has integral legs 42 which provide a mating feature for slidably connecting the cover 35 to slide locking features 69, 70 of the frame 34. The cover side walls 36, 37, end wall 39 and frame 34 cooperatively define a box-like enclosure for housing the air bag 50 and inflator 90 therein. The housing 32 further includes a retainer strap 38 which preferably has a stamped steel construction. The retainer strap 38 preferably has a generally rectangular shape which fits over the frame 34 and includes overlapping end flaps 72, 73. After the cover 35 is slid into the frame 34, the retainer strap 38 is installed to lock the cover 35 and frame 34 against relative sliding movement.

Figure 7:
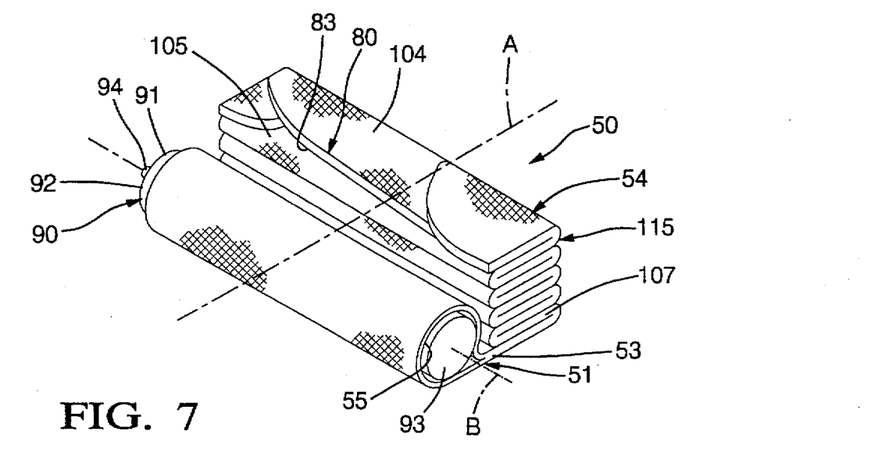
Figure 14:
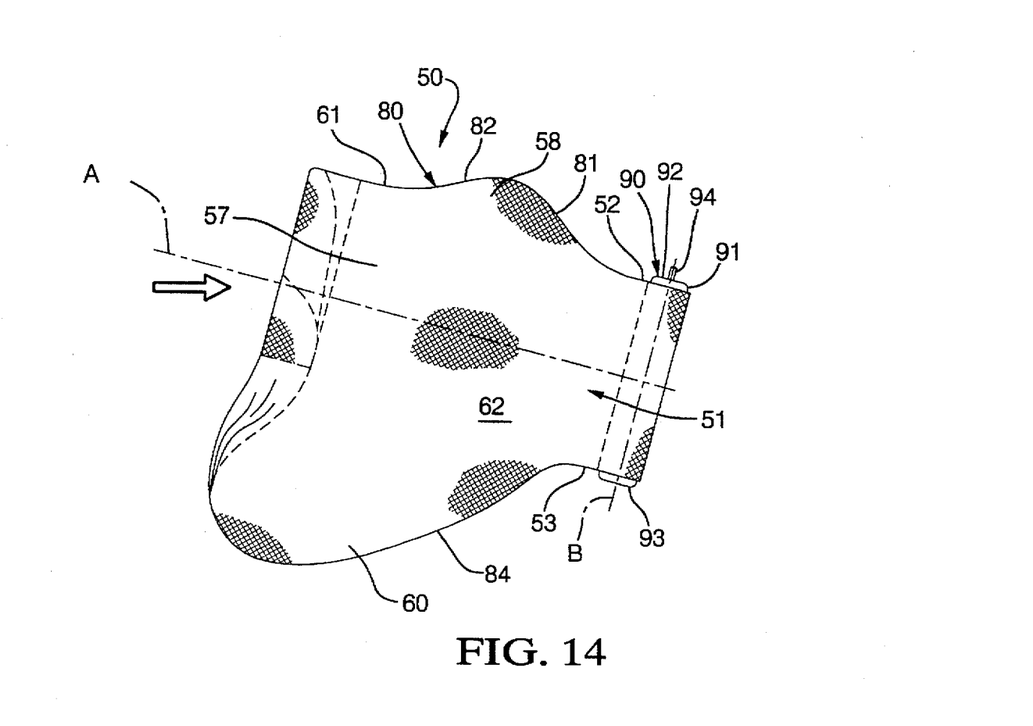
FIG. 14 is a side view showing an air bag in a partially deployed condition as viewed from the vehicle interior and including an arrow indicating an obstruction to air bag inflation.

As best shown in FIGS. 3, 7 and 14, the inflator 90 may be of any conventional construction, preferably being thrust neutral, which contains chemicals for igniting to generate gas for discharge upon the existence of predetermined vehicle 12 conditions. As shown in FIG. 3, the inflator 90 preferably has an axially elongated cylindrical body 91 including ports (not shown) through which the inflator gas discharges to inflate the air bag 50. The inflator 90 preferably includes an axially extending threaded fastener 94 on an end of the inflator 90 that axially extends beyond the frame 34 and becomes encaptured within the end flaps 72, 73 of the retainer strap 38. As best shown in FIG. 3, a nut 95 is installed onto the threaded fastener 94 of the inflator 90 to fixedly attach the retainer strap 38 onto the frame 34 while simultaneously fixedly attaching the inflator 90 to the frame 34. The inflator 90 includes an elongated, axially extending vertical axis B which preferably is tilted back relative the vertical axis of the vehicle 12 by about 20 to 25 degrees, and thus is preferably approximately parallel to the seat back 20. The inflator 90 includes an upper inflator end 92 and a lower inflator end 93. The inflator 90 also has the longitudinal axis A which is perpendicular to the elongated vertical axis B of the inflator 90 and which is parallel to the longitudinal direction of inflator gas flow into the air bag 50 as directed by the housing 32.

As shown in FIGS. 1–14, the air bag 50 is preferably made of a fabric material which is suitable for air bag construction. The air bag 50 is shaped and folded such that the air bag 50 deploys in downwardly direction relative the longitudinal axis A of the inflator 90.

The air bag 50 includes a neck portion 51, preferably extending straight out away from the inflator 90 in the longitudinal direction. The neck portion 51 has a side opening 55 which is suitably sized for receiving the inflator 90 therein. It will be appreciated that in the assembled condition, the neck portion 51 is preferably wrapped around the inflator 90 such that inflator gas is discharged directly into the air bag 50. The inflator 90 is axially inserted into the air bag 50 through the side opening 55 either before or after installation of the air bag 50 into the cover 35 of the housing 32.

Figure 2:
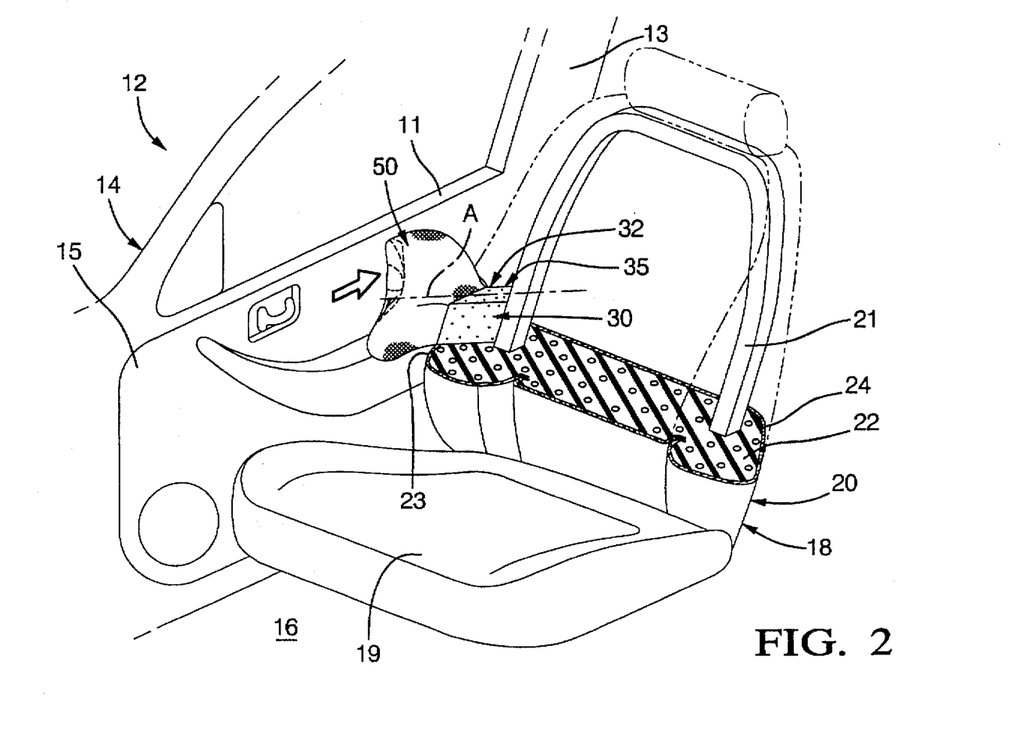
FIG. 2 is a perspective view similar to FIG. 1, but showing the air bag in a partially inflated condition and an arrow indicating an obstruction to air bag inflation.

The neck portion 51 of the air bag 50 has an upper neck edge 52 and a lower neck edge 53 corresponding with the upper inflator end 92 and the lower inflator end 93, respectively. The longitudinal axis A of the inflator 90 and the housing 32 is also the longitudinal axis A of the neck portion 51. The air bag 50 further includes an inflatable body portion 54 which is stored in the housing 32 in a folded condition and which inflates upon discharge of the inflator gas. As best shown in FIG. 2, the air bag 50 is normally stored in a folded condition within the cover 35 of the housing 32.

Figure 8A:
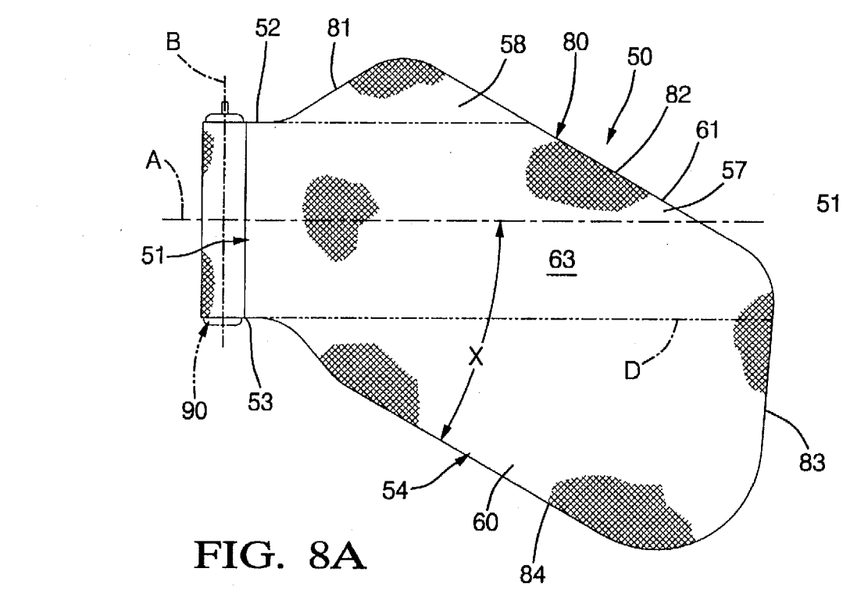
FIGS. 8A, 9A, 10A, 11A, 12A, and 13A, are side views illustrating steps for folding the air bag.
Figure 8B:
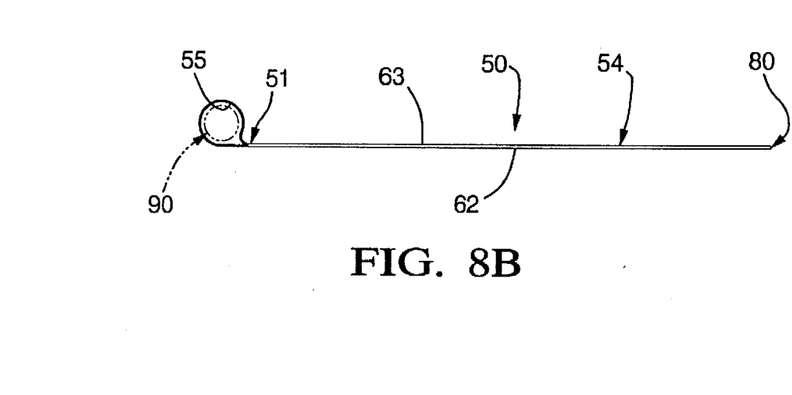
FIGS. 8B, 9B, 10B, 11B, 12B, and 13B are schematic bottom views further illustrating steps for folding the air bag.

The inflatable body portion 54 of the air bag 50 is asymmetrical about the longitudinal axis A. As best shown in FIG. 8A, preferably a greater portion of the main body portion 54 is located below the longitudinal axis A than is located above the longitudinal axis A. More specifically, the air bag 50 includes a central portion 57 extending straight longitudinally outward from the neck portion 51 and inflator 90 and having a vertical height approximately equal to that of the inflator 90 and neck portion 51. The air bag 50 also includes a generally triangular-shaped upper portion 58 located above the central portion 57 and a generally triangular-shaped lower portion 60 located below the central portion 57. The lower portion 60 has a volume significantly greater than the upper portion 58 and the lower portion 60 has a volume approximately equal to the central and upper portions 57, 58 of the air bag 50. The lower portion 60 has an increasing vertical dimension in a direction away from the neck portion 51 and inflator 90. The central portion 57 includes an outermost edge 61 which is downwardly angled in a direction away from the inflator 90 and neck portion 51.

The air bag 50 preferably includes an inboard wall 62 proximate the occupant and facing towards a center of the vehicle 12 when the air bag 50 is in the inflated condition and an opposite outboard wall 63 proximate the door 14 when the air bag 50 is in the inflated condition. The inboard and outboard walls 62, 63 are preferably similarly sized and shaped such that they matably align atop each other when the air bag 50 is in a generally flattened condition prior to folding as shown in FIG. 8A. The inboard and outboard walls 62, 63 of the air bag 50 each cooperatively form the main body portion 54 of the air bag 50 and preferably continuously extend to form the neck portion 51 of the air bag 50. The inboard and outboard walls 62, 63 may be constructed from a single piece of material or a plurality of pieces which are joined together such as by sewing.

The air bag 50 includes perimetric edges 80 defined by the intersection of the inboard and outboard walls 62, 63. Relative to the vertical axis B of the inflator 90, the air bag 50 includes an upwardly angled rear edge 81, a downwardly angled upper edge 82 partially defined by the outermost edge 61 of the central portion 57, a generally vertically extending forward edge 83, and a downwardly angled lower edge 84. The downwardly angled upper edge 82 and lower edge 84 are preferably parallel to each other and preferably define a downward air bag body angle X at which the main body portion 54 of the air bag 50 extends downwardly relative the longitudinal axis A of the inflator 90, neck portion 51, and housing 32. Preferably, the body angle X of the main body portion 54 relative the longitudinal axis A of the inflator 90 as shown in FIG. 8A is approximately equal to the seat back angle with which the vertical axis B of the inflator 90 is aligned. Thus, when the air bag 50 is deployed as positioned in the tilted seat back 20, the downwardly angled main body portion 54 of the air bag 50 deploys in a generally horizontal position relative the vehicle 12, as described in more detail below.

Figure 9A:
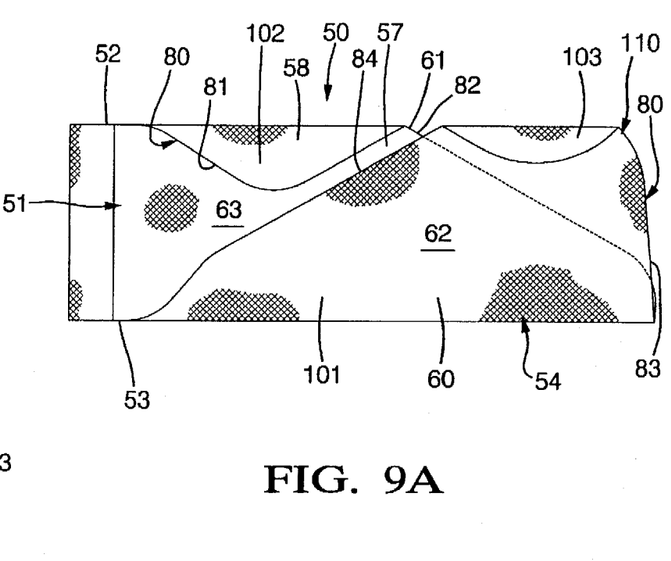

The air bag 50 is folded as will now be described. FIGS. 5, 6, 8A, 8B, 9A and 9B, show the first step in folding the air bag 50. A first longitudinal fold 101 is formed by folding the triangular-shaped lower portion 60 of the air bag 50 upwardly onto the central portion 57 of the air bag 50 along a lower longitudinal fold line D, which extends longitudinally outward from the lower neck edge 53. The triangular-shaped lower portion 60 is folded onto the outboard wall 63 of the air bag 50 such that it faces outboard away from the seat 18 and towards the door 14 when unfolding. When the first longitudinal fold 101 is folded as shown in FIG. 9A, the lower edge 84 of the air bag 50 now extends diagonally upward in a direction away from the inflator 90 and across the central portion 57 of the air bag 50.

FIGS. 5, 6, 8A, 8B, 9A and 9B, also show the second step in folding the air bag 50. A second longitudinal fold 102 is formed by folding the triangular-shaped upper portion 58 of the air bag 50 downwardly onto the central portion 57 of the air bag 50 along upper longitudinal fold line E, which extends longitudinally outward from the upper neck end 52. The upper portion 58 is also folded onto the outboard wall 63 of the air bag 50 such that the upper portion 58 faces outboard and away from the seat 18 and towards the door 14 when unfolding. When the second longitudinal fold 102 is folded, a rearward portion of the upper edge 82 of the air bag 50 preferably extends diagonally across the central portion 57 of the air bag 50 and parallel and adjacent to the lower edge 84 of the air bag 50. Thus, it will be appreciated that the first and second folds 101, 102, preferably do not overlap each other.

Figure 6:
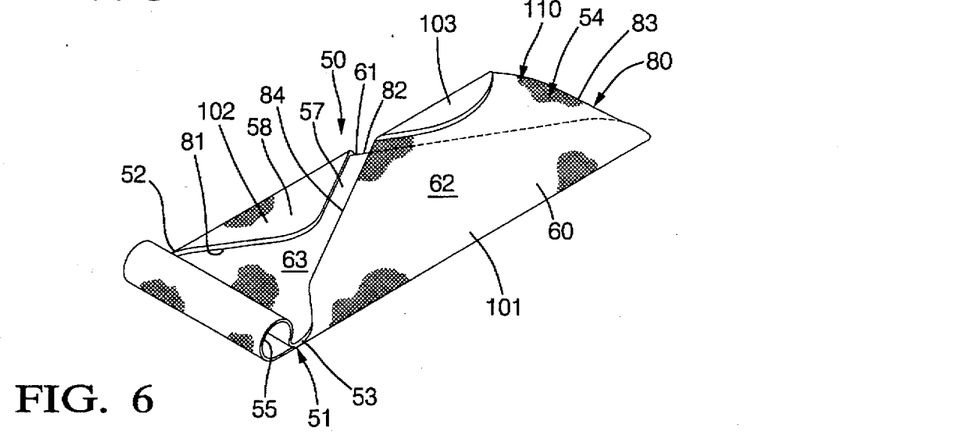
Figure 9B:
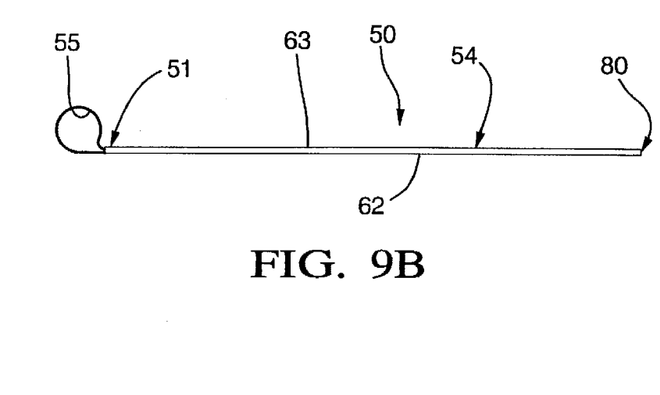

FIGS. 6, 9A and 9B, show the third step in folding the air bag 50. A third longitudinal fold 103 is formed by downwardly folding the lower portion 60 of the air bag 50, which extends above upper longitudinal fold line E, onto the inboard wall 62 of the air bag 50 atop the lower portion 60.

As best shown in FIG. 9A, the combination of first, second, and third longitudinal folds 101, 102, 103 hereinafter referred to as the longitudinally folded portion 110, has a vertical height generally equal to the height of the neck portion 51 and the height of the central portion 57 of the air bag 50. Thus, the longitudinally folded portion 110 of the air bag 50 now has a vertical height which enables easy insertion into the housing 32. As shown in the schematics in FIG. 9B, the longitudinally folded portion 110 preferably provides an air bag 50 having a thin lateral profile which at no point is more the double the thickness of the air bag 50 enabling compact folding of the air bag 50 within the module 30. It will further be appreciated that the first, second, and third longitudinal folds 101, 102, 103 may be made in any order.

Figure 10A:
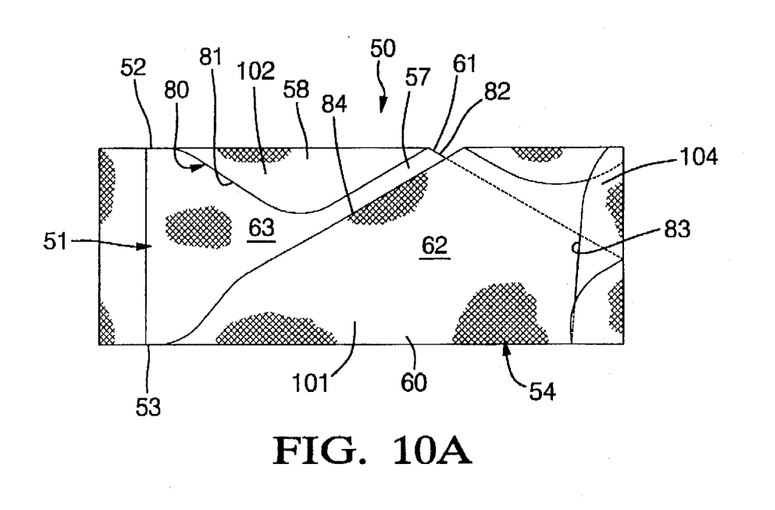
Figure 10B:
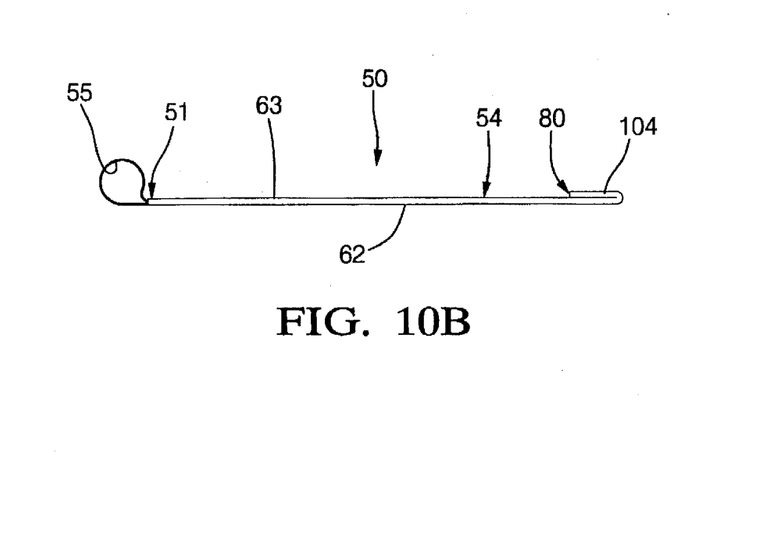
Figure 11A:
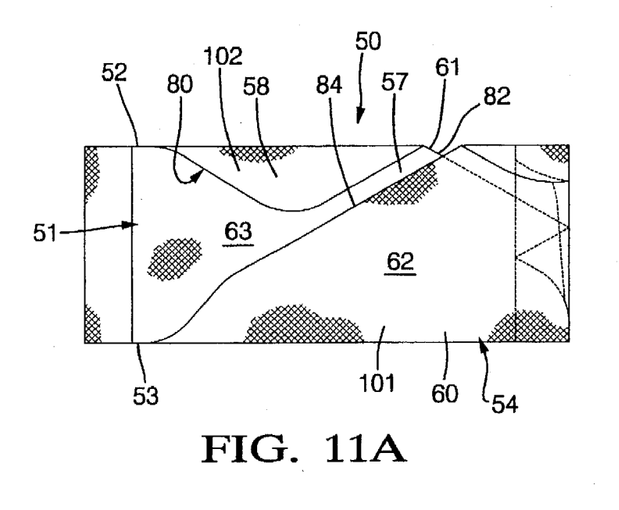
Figure 11B:
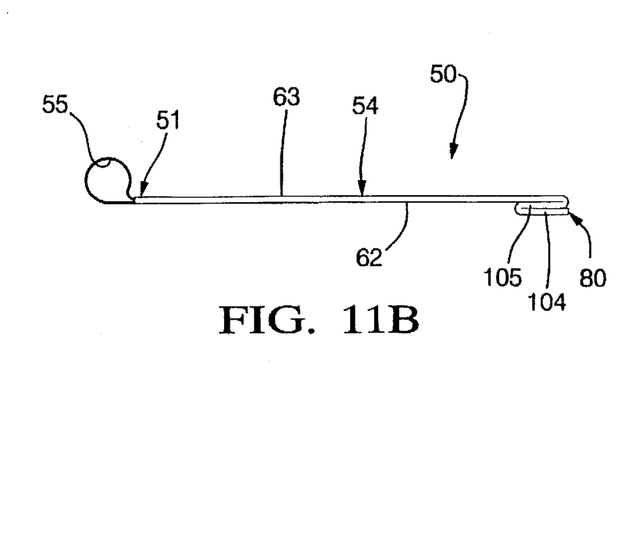
Figure 12A:
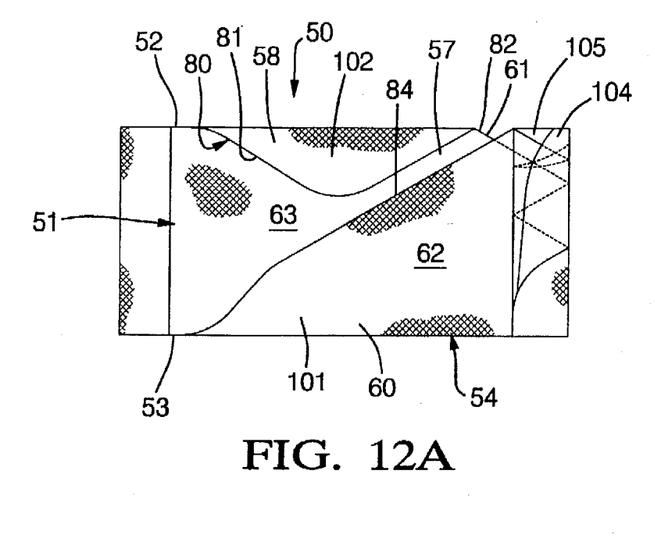
Figure 12B:
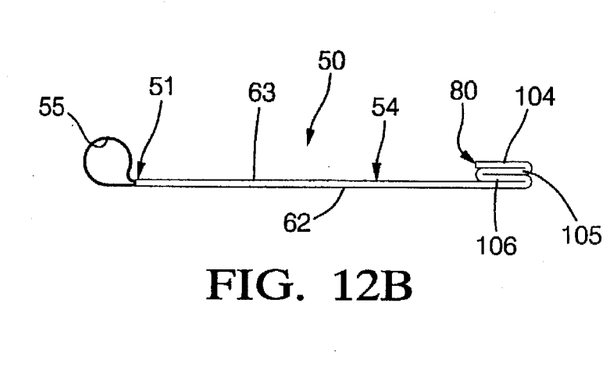

Referring to FIGS. 10A-13B, the air bag 50 is next provided with a plurality of longitudinally extending accordion pleat folds by folding the longitudinally folded portion 110 back and forth along vertical fold lines starting at the forward edge 83 and working towards the inflator 90 and neck portion 51 to form an accordion pleat fold stack 115, as will now be described. FIGS. 10A and 10B show the fourth step in folding the air bag 50. A first pleat fold 104 is formed by folding the forward edge 83 of the longitudinally folded portion 110 of the air bag 50 along a vertical fold line and towards the neck portion 51 and inflator 90, preferably in an outboard direction. FIGS. 11A and 11B, show a second pleat fold 105 in which the end of the longitudinally folded portion 110 of the air bag 50 formed by the first pleat fold 104 is folded over again along a vertical fold line in a direction opposite the first pleat fold 104 to form a second pleat fold 105 as best shown in FIG. 11B. As shown in FIGS. 12A and 12B, the longitudinally folded portion 110 of the air bag 50 is again folded along a vertical fold line to produce a third pleat fold 106 by folding in a direction opposite to the second pleat fold 105 and similar to the first pleat fold 104.

Figure 13A:
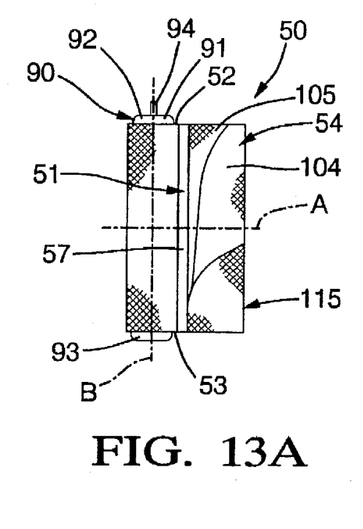
Figure 13B:
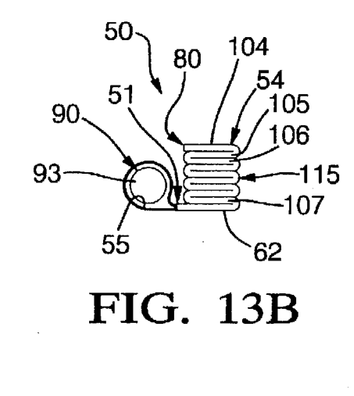

Finally, FIGS. 7, 13A and 13B, show the air bag 50 is in the final folded condition. This is accomplished by continuing to fold the longitudinally folded portion 110 of the air bag 50 back and forth along vertical fold lines towards the neck portion 51 and inflator 90 to form the accordion pleat stack 115 positioned adjacent the neck portion 51 and inflator 90 of the air bag 50. A final pleat fold 107 places the accordion pleat stack 115 adjacent to the neck portion 51 of the air bag 50. Each of the pleat folds of the accordion pleat stack 115 preferably has a longitudinal dimension approximately equal to one tenth the total longitudinal length of the air bag 50.

As shown in FIG. 3, the completely folded air bag 50 is then installed in the cover 35 of the housing 32 to maintain the air bag 50 in the folded condition prior to deployment. It will be appreciated that the inflator 90 may be assembled to the air bag 50 either before or after the air bag 50 is folded and either before or after the air bag 50 is installed in the housing 32. It will be appreciated that the plurality of pleat folds forming the accordion pleat stack 115 are oriented such that the folds extend parallel to the longitudinal axis A of the inflator 90 and thus are parallel to the direction of the discharging inflator gas. It will be appreciated that the final pleat fold 107 is positioned on an inboard side of the housing 32 adjacent the first cover side wall 36 such that the final pleat fold 107 connected to the neck portion 51 of the air bag 50 is furthest from the door 14 in the accordion pleat stack 115.

Figure 4:
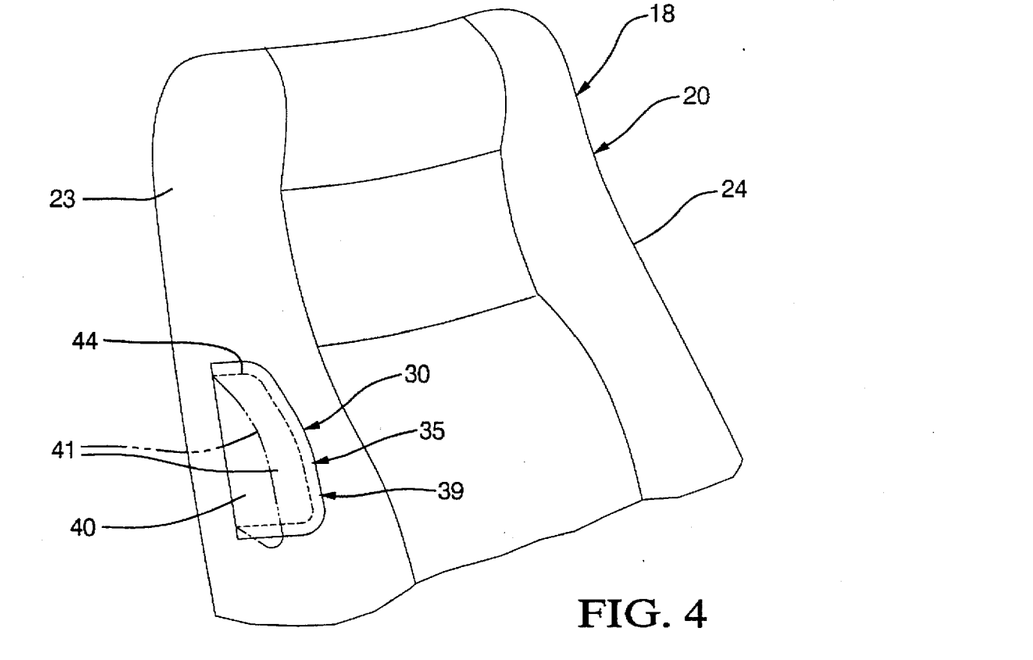
FIG. 4 is a perspective view of a vehicle seat partially-broken-away and showing an end wall of the module having a flap portion shown in an open condition in phantom lines.
Figure 5:
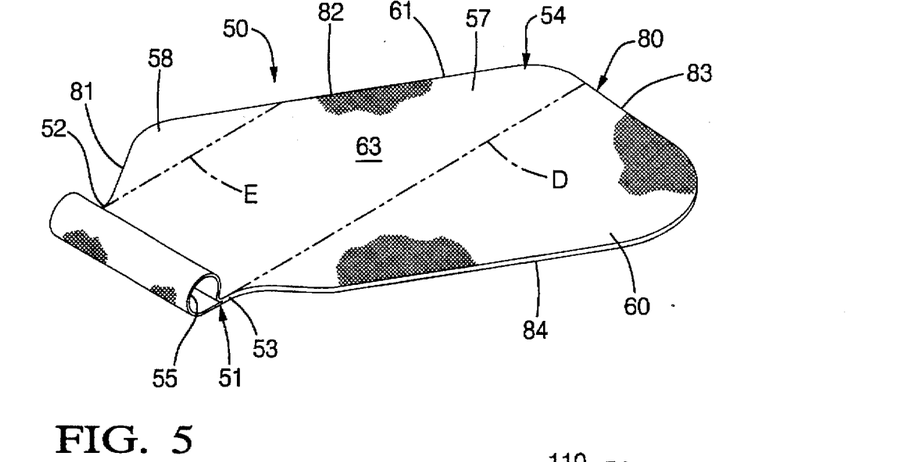
FIGS. 5–7 are perspective views illustrating steps for folding the air bag.

Upon the vehicle 12 sensing predetermined vehicle conditions, the inflator 90 begins to discharge inflator gas which is directed in the longitudinal direction by the housing 32. As best shown in FIG. 4, the inflating air bag 50 begins to fill and breaks open the C-shaped tear seam 44 on the end wall 39 of the cover 35 such the flap portion 41 pivots open about the rearward edge.

Advantageously, the downwardly angled main body portion 54 of the air bag 50 deploys in a downward direction relative the longitudinal direction, but horizontal relative the vehicle 12, as will now be described. The longitudinal axis A of the inflator 90 and housing 32 and thus the longitudinal direction of the discharging inflator gas is angled upward relative the horizontal direction of the vehicle 12 due to parallel alignment of the vertical axis B of the inflator 90 with the tilted seat back 20. However, the air bag 50 in the fully inflated condition is generally horizontal relative the vehicle 12 in the fully inflated condition since the main body portion 54 of the air bag 50 has a shape which is angled downwardly from the longitudinal direction. Thus, in the deployed condition, the downwardly angled upper edge 82 and the downwardly angled lower edge 84 are each generally horizontal relative the vehicle 12. Preferably, the downwardly angled upper edge 82 is approximately parallel to and even with the belt line 11 of the door 14 when the air bag 50 is fully inflated. Thus, it will be appreciated that the amount of body angle X of the air bag 50 can be adjusted to compensate for the amount of tilting of the seat back 20 so that a horizontally positioned air bag 50 can be deployed from a module 30 having an inflator 90 that has a vertical axis B parallel with the seat back 20, but tilted relative the vertical axis of the vehicle 12.

During the initial stages of inflation, the central portion 57 of the air bag 50 is quickly filled with inflator gas and unfolds. It will be appreciated that the lower longitudinal fold line D forms a pinch point which biases the central portion 57 of the air bag 50 towards filling prior to the more forward, relatively large lower portion 60 of the air bag 50 when air bag inflation is unrestrained. During inflation the first, second, and third longitudinal folds 101, 102, 103 all preferably unfold in a direction away from the seat 18 such that a generally inner flat face is preferably presented to the occupant. The air bag 50 is shown in the fully inflated condition in phantom lines in FIG. 1.

FIGS. 2 and 14 show the air bag 50 as viewed from the vehicle interior 16 when air bag inflation is obstructed, as indicated by the arrow. The air bag 50 initially inflates in the longitudinal direction until the central portion 57 and the accordion pleat stack 115 are inhibited by the obstruction from unfolding in the longitudinal direction. Thus, the path of least resistance for the inflator gas becomes the unfolding of the first longitudinal fold 101 and the downwardly filling of the lower portion 60 of the air bag 50. Thus, longitudinal inflation of the air bag 50 is temporarily retarded as the lower portion 60 of the air bag 50 is also filled. Since the longitudinal direction of the inflator 90 is upward relative the vehicle 12, the upward inflation forces on the obstruction are also temporarily retarded as the lower portion 60 is filled.

In addition to the elongated vertical axis B of the inflator 90 being tilted backwards with respect to the vertical axis of the vehicle, it is also preferred that the longitudinal axis A is directed outboard relative the forward direction of the vehicle 12 and towards the door 14, preferably at approximately 20 degrees, such that air bag inflation is directed away from the seat 18. Since the folds of the accordion pleat stack 115 are longitudinal, they assist the air bag 50 in deploying in the longitudinal direction and away from the seat 18. During air bag deployment, the air bag 50 initially inflates in the longitudinal direction as directed by the inflator gas and engages the inner door panel 15 of the door 14. The air bag 50 interaction with the door 14 directs the air bag 50 towards the forward direction of the vehicle 12. It will be appreciated that the flap portion 41 may also be used to help direct the inflation of the air bag 50 in the forwardly direction.

It will be understood that a person skilled in the art may make modifications to the embodiments shown herein within the scope and intent of the claims. For example, although the module 30 is shown located in the seat 18 on a passenger's side of the vehicle 12, it will be appreciated that the shape and the fold of the air bag 50 can be mirrored for use in a seat on the driver's side of the vehicle 12 and can also be used on rear seats of the vehicle 12. It will further be appreciated that the module 30 could also be used in other locations in the vehicle 12 when it is desirable to direct the air bag 50 in a direction angled from the longitudinal direction of the discharging inflator gas. For example, if the inflator 90 is tilted forward relative the vertical axis of the vehicle 12, the main body portion 54 of the air bag 50 could be upwardly angled relative the longitudinal axis such that the main body portion 54 of the air bag 50 deploys horizontally relative the vehicle 12. Although the air bag 50 is shown as being accordion folded into the accordion pleat fold stack 115 after the upper and lower portions 58, 60 of the air bag 50 are longitudinally folded to the height of the module 30, it will further be appreciated that the longitudinally folded portion 110 may be unidirectionally rolled along the outboard wall 63 of the air bag 50 away from the seat 18 or a combination of rolling and accordion folding may be utilized. While the longitudinal axis A is preferably angled outward about 20 degrees relative the forward direction of the vehicle 12, the longitudinal axis A may be angled outward a greater or lesser amount. Also, the vertical inflator axis B, may be tilted back more or less relative to the seat back 20 and the main body angle X of the air bag 50 may be adjusted accordingly for horizontal deployment relative the horizontal axis of the vehicle 12.

While the present invention has been described as carried out in a specific embodiment thereof, it is not intended to be limited thereby but is intended to cover the invention broadly within the scope and spirit of the appended claims.

What is claimed is:

1. An air bag module in a vehicle having a vertical vehicle axis and having a horizontal vehicle axis, the air bag module comprising:
   - an inflator having an elongated vertical inflator axis, the inflator for discharging inflator gas directed in a longitudinal direction perpendicular to the vertical inflator axis; and
   - an air bag having a main body portion having a shape that is angled with respect to the longitudinal direction.

2. The air bag module of claim 1 wherein the inflator is stored in a housing and wherein the inflator gas is directed in the longitudinal direction by the housing.

3. The air bag module of claim 1 wherein the longitudinal direction is angled upwardly relative the horizontal vehicle axis and wherein the main body portion of the air bag is angled downwardly relative the longitudinal direction.

4. The air bag module of claim 3 wherein the main body portion has upper and lower edges which are generally horizontal relative the vehicle when the air bag is inflated.

5. The air bag module of claim 1 wherein the vertical inflator axis is angled backwards relative the vertical vehicle axis and wherein the main body portion is angled downwardly approximately the same amount relative to the longitudinal direction as the vertical inflator axis is angled backwards relative to the vertical vehicle axis whereby upon air bag deployment the main body portion is generally parallel relative to the horizontal vehicle axis.

6. The air bag module of claim 1 wherein the discharging inflator gas is directed upwardly relative the horizontal vehicle axis and the main body portion includes upper and lower downwardly angled edges, the edges being generally parallel to the horizontal vehicle direction when the air bag is inflated.

7. The air bag module of claim 1 wherein the air bag has a longitudinally extending neck portion connected to the inflator and wherein the main body portion extends at a downward angle relative to the neck portion.

8. The air bag module of claim 1 wherein the longitudinal direction is angled upwardly relative the horizontal vehicle axis and wherein the main body portion of the air bag includes an inboard wall and an outboard wall directly opposite the inboard wall, the main body portion having an upper edge and a lower edge defined by the intersection of the inboard and outboard walls, the upper and lower edges being angled downwardly relative the longitudinal direction approximately the same amount that the longitudinal direction is angled upwardly relative the horizontal vehicle axis whereby upon air bag deployment, the upper and lower edges are generally parallel to the horizontal vehicle axis.

9. The air bag module of claim 1 wherein the main body portion of the air bag includes a central portion extending in the longitudinal direction and wherein the air bag includes a lower portion extending downward from the central portion.

10. The air bag module of claim 9 wherein the lower portion has a generally triangular shape.

11. The air bag module of claim 9 wherein the lower portion has a vertical dimension continually increasing in a direction away from the inflator.

12. The air bag module of claim 9 wherein the lower portion has a volume substantially equal to or greater than the central portion.

13. The air bag module of claim 9 wherein the air bag includes an upper portion extending upwardly from the central portion and wherein the upper portion is substantially smaller than the lower portion and the central portion.

14. The air bag module of claim 9 wherein the lower portion is longitudinally folded atop the central portion.

15. The air bag module of claim 9 wherein the lower portion is longitudinally folded atop the central portion such that when inflation of the air bag is unrestrained, the inflator gas is biased towards initially filling the central portion and when air bag inflation is obstructed, the inflator gas is biased towards unfolding and filling the lower portion of the air bag.

16. The air bag module of claim 9 wherein the lower portion is longitudinally folded atop the central portion to define a longitudinally folded portion and wherein the longitudinally folded portion includes a series of accordion-type pleat folds and wherein the pleat folds are oriented parallel to the longitudinal direction of the discharging inflator gas.

17. The air bag module of claim 1 wherein the air bag is housed in a cover having an inner side edge and an outer side edge being parallel to and spaced apart from the inner side edge, the edges both extending in the longitudinal direction and the inner side edge being longer than the outer side edge.

18. The air bag module of claim 1 wherein the main body portion has an upper portion and a lower portion and wherein the air bag is asymmetrical in the vertical direction with the lower portion sized greater than the upper portion.

19. The air bag module of claim 1 wherein the main body portion includes a generally vertically extending inboard wall and an outboard wall and wherein the walls have intersecting edges defining an upper edge and a lower edge both angled downwardly relative to the longitudinal direction.

20. An air bag module in a vehicle having a vertical vehicle axis and having a horizontal vehicle axis, the vehicle including a vehicle seat having a seat back tilted backwards relative the vertical vehicle axis and a vehicle door located outboard the vehicle seat, the air bag module comprising:

an inflator having a vertical inflator axis being generally parallel to the seat back, the inflator for discharging gas directed in a longitudinal direction perpendicular to the vertical inflator axis; and an air bag for inflation upon generation of gas by the inflator, the air bag having a main body portion having a shape that is angled downwardly with respect to the longitudinal direction.

21. The air bag module of claim 20 wherein the longitudinal direction is angled outwardly towards the vehicle door and wherein the air bag initially deploys in the longitudinal direction and is guided towards a forward vehicle direction during inflation by interaction with the vehicle door.

22. A method of folding an air bag having an inboard wall and an outboard wall, the air bag having a longitudinally extending central portion and a triangular-shaped lower portion extending below the central portion, the lower portion having a downwardly angled lower edge, the method comprising the step of:

folding the lower portion upwardly along a longitudinally extending lower edge of the central portion to form a pinched longitudinal edge between the lower portion and the central portion and such that the lower edge diagonally extends across the central portion.

23. The method of claim 22 further including the steps of longitudinally folding the air bag to a vertical height equivalent to a vertical height of the central portion to form a longitudinally folded portion and folding the longitudinally folded portion back and forth along vertical fold lines to provide a plurality of longitudinally extending pleat folds forming an accordion pleat stack.

* * * * *